United States Patent
Schreck

(10) Patent No.: US 9,092,470 B2
(45) Date of Patent: Jul. 28, 2015

(54) METHOD AND SYSTEM FOR STORING TABULAR DATA IN A MEMORY-EFFICIENT MANNER

(71) Applicant: SOFTWARE AG, Darmstadt (DE)

(72) Inventor: Daniel U. Schreck, Saarbrücken (DE)

(73) Assignee: SOFTWARE AG, Darmstadt (DE)

( * ) Notice: Subject to any disclaimer, the term of this patent is extended or adjusted under 35 U.S.C. 154(b) by 11 days.

(21) Appl. No.: 13/648,673

(22) Filed: Oct. 10, 2012

(65) Prior Publication Data

US 2014/0059085 A1    Feb. 27, 2014

(30) Foreign Application Priority Data

Aug. 24, 2012    (EP) ..................................... 12181657

(51) Int. Cl.
    *G06F 17/30* (2006.01)
(52) U.S. Cl.
    CPC ................................ *G06F 17/30315* (2013.01)
(58) Field of Classification Search
    USPC .......... 707/791, 801, 812, 783, 100; 711/144, 711/172, 105
    See application file for complete search history.

(56) References Cited

U.S. PATENT DOCUMENTS

| | | | | |
|---|---|---|---|---|
| 4,908,789 | A * | 3/1990 | Blokkum et al. | 711/172 |
| 5,537,588 | A * | 7/1996 | Engelmann et al. | 711/144 |
| 6,715,063 | B1 * | 3/2004 | McGrath | 712/233 |
| 7,296,112 | B1 * | 11/2007 | Yarlagadda et al. | 711/105 |
| 7,600,037 | B2 * | 10/2009 | Tucker | 709/235 |
| 7,885,988 | B2 * | 2/2011 | Bashyam et al. | 707/812 |
| 8,452,737 | B2 * | 5/2013 | Netz et al. | 707/687 |
| 8,527,544 | B1 * | 9/2013 | Colgrove et al. | 707/791 |
| 2002/0029282 | A1 * | 3/2002 | Buddhikot et al. | 709/231 |
| 2005/0102297 | A1 * | 5/2005 | Lloyd et al. | 707/100 |
| 2007/0061544 | A1 | 3/2007 | Uppala | |
| 2010/0030796 | A1 | 2/2010 | Netz et al. | |
| 2011/0082887 | A1 * | 4/2011 | Friedlander et al. | 707/783 |
| 2011/0252073 | A1 * | 10/2011 | Pauly | 707/812 |
| 2011/0264667 | A1 | 10/2011 | Harizopoulos et al. | |

OTHER PUBLICATIONS

M. Ivanova, et al., "Self-Organizing Strategies for a Column-Store Database," Proceedings of the 11$^{th}$ International Conference on Extending Database Technology Advances in Database Technology, EDBT, Mar. 25, 2008, pp. 157-168.

(Continued)

*Primary Examiner* — Mariela Reyes
*Assistant Examiner* — Thong Vu
(74) *Attorney, Agent, or Firm* — Nixon & Vanderhye PC

(57) ABSTRACT

Certain example embodiments relate to a method of storing data in a tabular data structure having columns and rows in a column-oriented storage system. At least one of the columns is divided into a plurality of segments. Each segment has an associated cell size that indicates the maximum size of the data items in the respective segment. When storing a data item into one of the segments, it is determined whether the size of the data item exceeds the cell size of the segment; and if the size of the data item exceeds the cell size of the segment, the cell size of the segment is adapted to accommodate the size of the data item. The adapting of the cell size of the segment to accommodate the size of the data item is performed independent of the cell sizes of the other of the plurality of segments.

21 Claims, 7 Drawing Sheets

(56) References Cited

OTHER PUBLICATIONS

Figure 3:
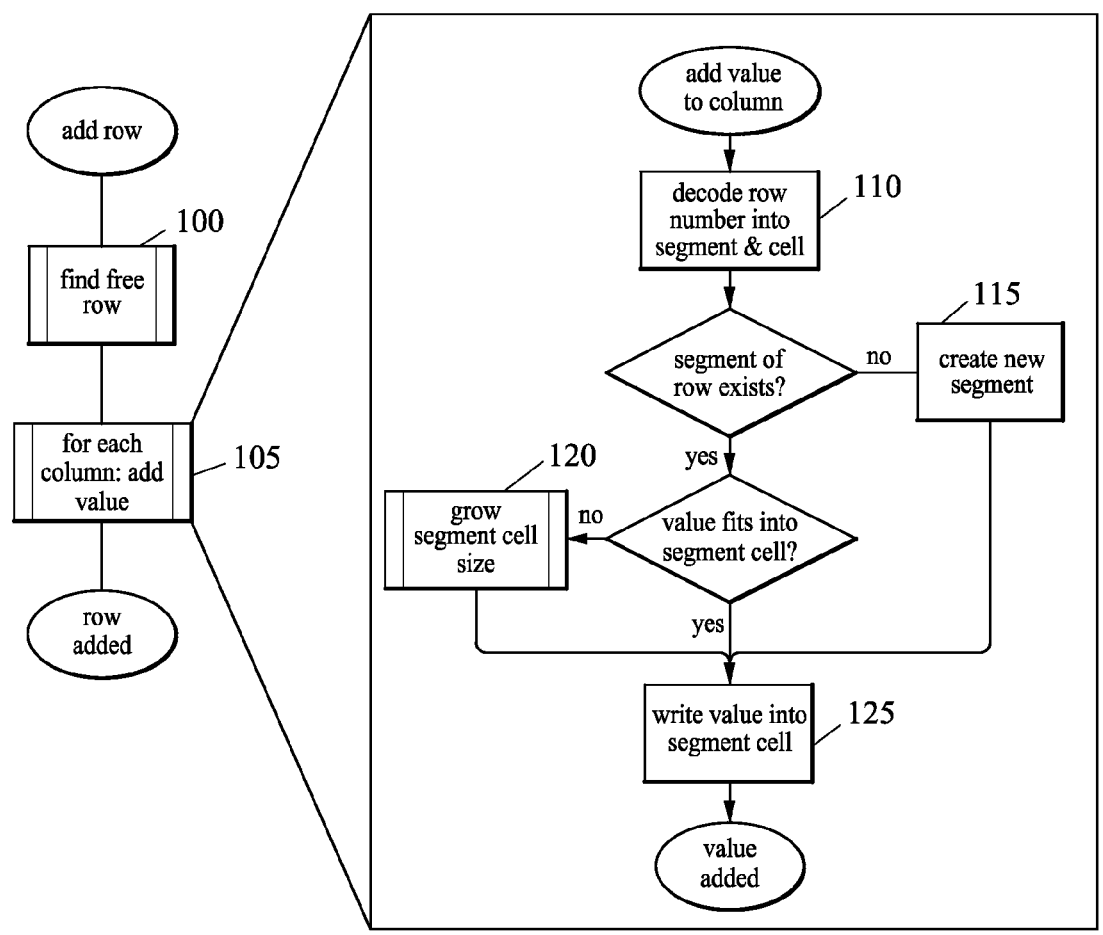

M. Stonebraker, et al., "C-Store: A Column-Oriented DBMS," Proceedings of the 31$^{st}$ VLDB Conference, 2005, pp. 553-564.

George P. Copeland and Setrag N. Khoshafian, 1985. A decomposition storage model. In Proceedings of the 1985 ACM SIGMOD international conference on Management of data (SIGMOD '85). ACM, New York, NY, USA, 268-279.

* cited by examiner

Fig. 1

| Row | "Duration" |
|---|---|
| 0 | 78 |
| 1 | 5 |
| 2 | 90 |
| 3 | 43 |
| 4 | 15 |
| 5 | 23 |

C1 ↗ (column label for Duration)

S1 brackets rows 0–5

| Row | "Duration" |
|---|---|
| 6 | 523 |
| 7 | 302 |
| 8 | 6887 |
| 9 | 58 |
| 10 | 20 |
| 11 | 18791 |

S2 brackets rows 6–11

| Row | "Quantity" |
|---|---|
| 0 | 2130 |
| 1 | 18206 |
| 2 | 78 |
| 3 | 9521 |

C2 ↗ (column label for Quantity)

S3 brackets rows 0–3

| Row | "Quantity" |
|---|---|
| 4 | 12 |
| 5 | 67 |
| 6 | 12 |
| 7 | 7 |

S4 brackets rows 4–7

| Row | "Quantity" |
|---|---|
| 8 | 589 |
| 9 | 31 |
| 10 | 12675 |
| 11 | 10785 |

S5 brackets rows 8–11

Fig. 2a

| Row | Age | Quantity |
|-----|-----|----------|
| 0 | 64 | 28 |
| 1 | 17 | 12 |
| 2 | 23 | 63 |
| 3 | 42 | 15 |
| 4 | 8 | 95 |
| 5 | 32 | 35 |
| 6 | 26 | 87 |
| 7 | 58 | 24 |
| 8 | 92 | 12 |
| 9 | 70 | 7 |
| 10 | | |
| 11 | | |

} pre-allocated empty rows

Fig. 2b

| Row | Age | Quantity |
|-----|-----|----------|
| 0 | 64 | 28 |
| 1 | 17 | 12 |
| 2 | 23 | 63 |
| 3 | 42 | 15 |
| 4 | 8 | 95 |
| 5 | 32 | 35 |
| 6 | 26 | 87 |
| 7 | 58 | 24 |
| 8 | 92 | 12 |
| 9 | 70 | 7 |
| 10 | 30 | 1235 |
| 11 | | |

METHOD AND SYSTEM FOR STORING TABULAR DATA IN A MEMORY-EFFICIENT MANNER

This application claims priority to EP Application No. 12 181 657.3, filed Aug. 24, 2012, the entire contents of which is hereby incorporated by reference.

1. TECHNICAL FIELD

Certain example embodiments of the present invention relate to a method and system for storing data in a tabular data structure.

2. BACKGROUND AND SUMMARY

Modern computer systems oftentimes operate on tabular data, i.e. data which is structured as a two-dimensional table, wherein each data item (also called "cell") can be addressed by its column and row number. Popular examples of systems supporting such tabular data structures are database systems, such as relational database systems. The theoretical concepts underlying tabular data storage approaches have been the subject of scientific research dating back to the 1970s (for an overview see e.g. G. Copeland et al.: "A decomposition storage model", Proceedings of the 1985 ACM SIGMOD international conference on Management of data (SIGMOD '85). ACM, New York, N.Y., USA, 268-279).

Accordingly, on a conceptual level tabular data can be understood as a two-dimensional table. However, when storing such data the two-dimensional data must be serialized into a one-dimensional sequence of bits in order to be stored in the working memory (e.g. RAM) and/or persistent storage means (e.g. hard drive) of the underlying computer hardware. To this end, most conventional database management systems (DBMS) follow the so-called row oriented approach, in that the two-dimensional table is stored one row after the other. Another approach is followed by so-called column-oriented DBMS, which store their data tables as series of columns. Both approaches have their individual advantages and drawbacks, e.g. column-oriented systems are more efficient when an aggregate needs to be computed over many rows but only for a notably smaller subset of all columns of data, because reading that smaller subset of data can be faster than reading all data. On the other hand, row-oriented systems are more efficient when many columns of a single row are required at the same time, and when row-size is relatively small, as the entire row can be retrieved with a single disk seek. Regardless of the used storage strategy, a physical storage allowing fast random access reads can greatly increase the operation speed. The random access allows minimizing the amount of read data in case of queries where only few fields and few rows have to be read. It achieves this because only the individual cells of interest have to be transferred from the storage. Finding those individual cells is easiest and fastest if all cells of a type have the same size because the address of the cell can then be calculated through a simple multiplication.

A further obstacle which affects both approaches is that the data in a table is seldom static, since new rows are frequently added, deleted, and cell values may be changed. For example, if a cell is added to a column and that cell does not fit into the number of bits available per cell in this column, the underlying data structure of the column has to be adapted. In particular in row-oriented storage models, the costs to change a column's width (i.e. the number of bits available per cell) may be prohibitive, since whole rows must be re-coded, effectively resulting in the whole table being converted.

In the column-oriented storage model, a simple strategy for adapting the data structure is to increase the number of bits per cell for the affected column. This strategy, however, has two drawbacks that become particularly relevant if the column is large. Firstly, all the cells of the old structure with the old cell capacity need to be transformed into the new structure with the increased cell capacity. Secondly, as long as this transformation is running, the amount of memory allocated for the old and new data structures together is more than twice as large as that of the old structure alone. This means on the one hand, that the system must provide a lot more memory than is actually needed outside the transformation operation. Secondly, there is additional effort for the automatic memory management system that operating environments usually provide nowadays.

The load on automatic memory management systems is particularly problematic in devices with very limited resources in terms of computing power and/or memory access speed, such as embedded systems or smartphones. On the other end of the spectrum, applications on large server class machines using many gigabytes of working memory can also run into issues resulting from high load on automatic memory management and the resulting loss in computing power and responsiveness.

In summary, conventional compressed column-oriented storage systems for frequently changing tabular data suffer from the following drawbacks: increased processing time to transform data of a column, and temporarily doubled memory consumption (with its associated load on automatic memory management).

It is therefore the technical problem underlying certain example embodiments of the present invention to provide an improved method and system for storing tabular data which is more resource efficient in terms of memory and processing power consumption, thereby at least partly overcoming the above explained disadvantages of the prior art.

This problem is according to one aspect of the invention solved by a method of storing data in a tabular data structure having columns and rows in a column-oriented storage system (e.g. a database, a database management system (i.e. a system comprising a database and processing logic for accessing the database), or any other storage system operable to store tabular data, i.e. most generally denoted a "table store"). In the embodiment of claim 1, the method comprises the steps of:

a. dividing at least one of the columns into a plurality of segments, wherein each segment has an associated cell size which indicates the maximum size of the data items in the respective segment;

b. when storing a data item into one of the segments,
   determining whether the size of the data item exceeds the cell size of the segment; and
   if the size of the data item exceeds the cell size of the segment, adapting the cell size of the segment to accommodate the size of the data item;

c. wherein adapting the cell size of the segment to accommodate the size of the data item is performed independent of the cell sizes of the other of the plurality of segments.

Accordingly, the embodiment is based on the general concept of splitting the column(s) of a table into smaller sub-units called segments. Each data item within a segment has the same size (e.g. the number of bits allocated for storing a data item) indicated by the segment's cell size, but the different segments may have different cell sizes. This way, it is possible to have e.g. a column with two segments, wherein the first segment stores data items with only 128 bits, while the second segment stores data items having 256 bits. As can be seen, this approach has considerable advantages when a new data item is added to a table segment which exceeds the segment's maximum cell size. This is because in this case, only the cell size of the affected segment needs to be adapted (in this case: increased) to accommodate the size of the new data item, but the other segments do not have to be adapted. This is beneficial both in terms of performance (since only a subset of the column needs to be adapted, namely the affected segment) and memory consumption (since the segments can be chosen to require only a minimum amount of storage capacity). In summary, splitting a column into multiple subunits (segments) allows for a more fine-grained memory optimization. It should be noted that since the adaptation of the affected segment's cell size is preferably performed when a new data item is to be stored into the table, the above-explained approach is particularly flexible, dynamic and self-optimizing. However, the general concept of adapting the cell sizes on a per-segment-level may in alternative embodiments also be employed independent of a specific request for storing a new data item, such as periodically (e.g. as a background process) or manually by an administrator.

In another aspect of the present invention each segment has an associated segment size which indicates the maximum number of data items in the respective segment (of course, the segment sizes may differ between columns). Preferably, all segments of a column have the same segment size. Accordingly, not only the size of the individual data items within a segment can be limited by an upper boundary (the above-explained cell size), but also the number of data items allowed per segment (by means of the segment size). Choosing an optimal segment size can lead to considerable performance and memory usage improvements, as will be explained in more detail further below. Furthermore, if all segments of a given column have the same segment size, the address calculation of the individual data items is particularly fast and efficient.

Furthermore, the method may comprise a step of determining an optimal segment size based on characteristics of the underlying hardware system, such as a bandwidth between the working memory and the processor. Additionally or alternatively, the step of determining an optimal segment size may be based on statistics on the data stored in the tabular data structure and/or on the frequency of addition, update and/or removal operations performed on the data of the tabular data structure. Also, the step of determining an optimal segment size may be performed: (a) automatically when data is added, updated and/or removed (i.e. the determination of the optimal segment size is both automatic (i.e. self-optimizing) and dynamic); (b) automatically and periodically (i.e automatic and non-dynamic), and/or (c) manually.

Since the method of the embodiment of claim 1 operates in a column-oriented storage system, the columns of the tabular data structure are preferably stored one after the other in a working memory and/or persistent storage means of the storage system. Accordingly, this aspect follows the column-oriented approach explained in the introductory part above (also called columnar table storage). This aspect is particularly efficient for minimizing the memory consumption of the tabular data, as the data items of one column (usually) have the same data type and a similar memory consumption. Of course, it is also advantageous when an entire new column needs to be added to an existing table, since in this case the new column can be simply appended to the serialized one-dimensional data structure. In other words, segmenting the data values on a column-basis is particularly advantageous, since the values of one particular column typically fall into the same value range and thus each have a similar memory requirement. The cells of a row, on the contrary, typically have quite different memory requirements. Combining the column-oriented segmenting with the column-oriented storage model is particularly advantageous, since if the row-oriented storage model was used, changing the cell size would require to copy/move all cells of the segment and not only the cells of the particular column. It should be noted that while in the column-orientated approach the data is generally stored by column, a particular column is not necessarily contiguous as if one of its segments has had to be adapted to cope with change of cell size it may no longer be in its original place in the memory.

Moreover, the method may comprise the further steps of providing a dictionary data structure which maps data items to integer values and storing the integer value in the tabular data structure instead of the data item. Accordingly, instead of the actual data item (e.g. a data item of type "text" with the value "Smith") only a simple integer value (e.g. "123") is stored in the table and/or respectively in the serialized memory representation, which leads to less memory consumption, since the data is effectively compressed. To achieve such a compression, a dictionary is then provided which maps the data items to the integer values (in the sense of "Smith"="123"), so that the data can be resolved.

Preferably, adapting the cell size of the segment to accommodate the size of the data item comprises selecting a minimum number of bits needed for storing the biggest data item in the respective column. This way, the memory representation of the table data structure can be kept as small as possible.

Certain example embodiments of the present invention are also directed to a computer program comprising instructions for implementing any of the above-described methods. Lastly, also a column-oriented storage system is provided for storing data in a tabular data structure having columns and rows, wherein the system comprises means for dividing at least one of the columns into a plurality of segments, wherein each segment has an associated cell size which indicates the maximum size of the data items in the respective segment; means for storing a data item into one of the segments, adapted for determining whether the size of the data item exceeds the cell size of the segment, and if the size of the data item exceeds the cell size of the segment, adapting the cell size of the segment to accommodate the size of the data item; wherein adapting the cell size of the segment to accommodate the size of the data item is performed independent of the cell sizes of the other of the plurality of segments.

Further advantageous modifications of embodiments of the system of the invention are defined in further dependent claims. It will be appreciated that such embodiments of the system may be adapted to perform in accordance with any of the above-described methods.

3. SHORT DESCRIPTION OF THE DRAWINGS

Figure 4:
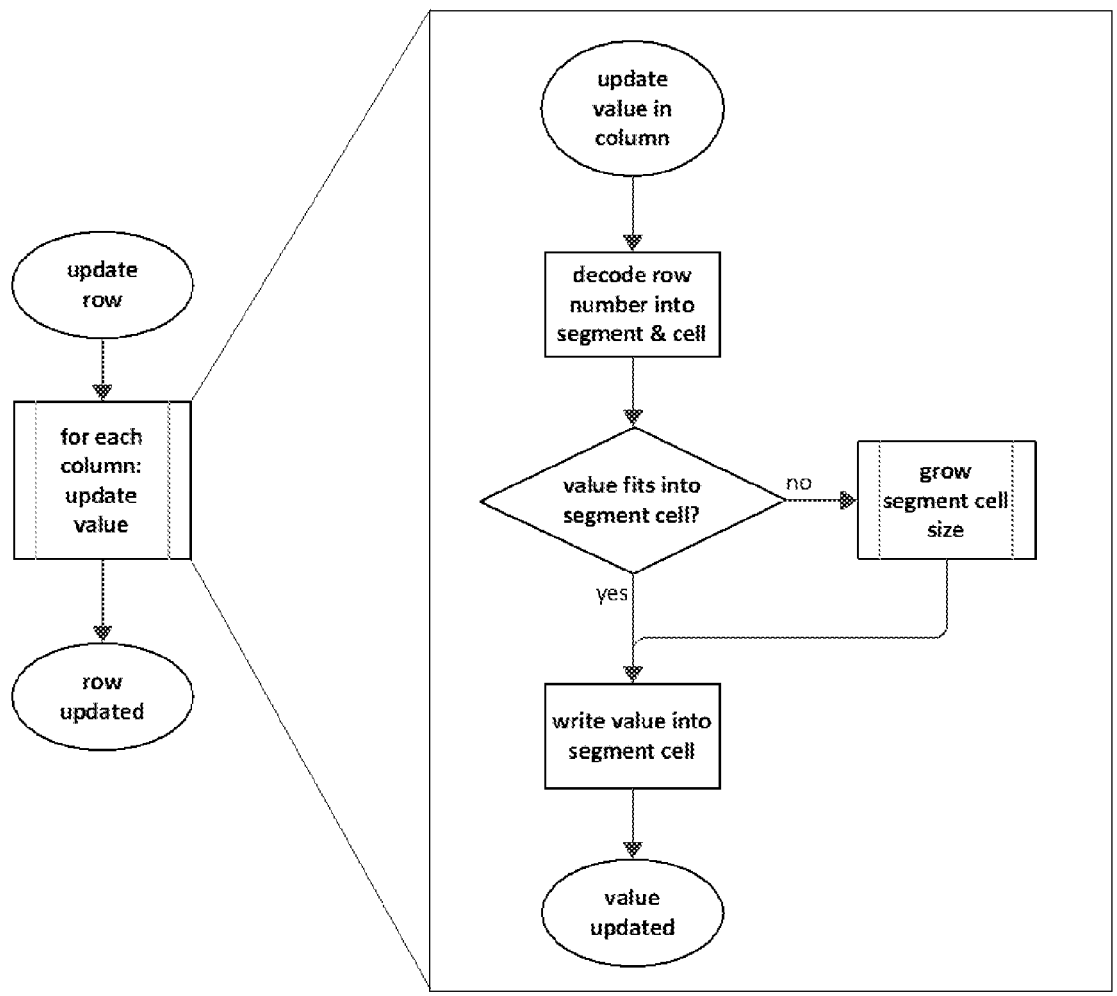
Figure 5:
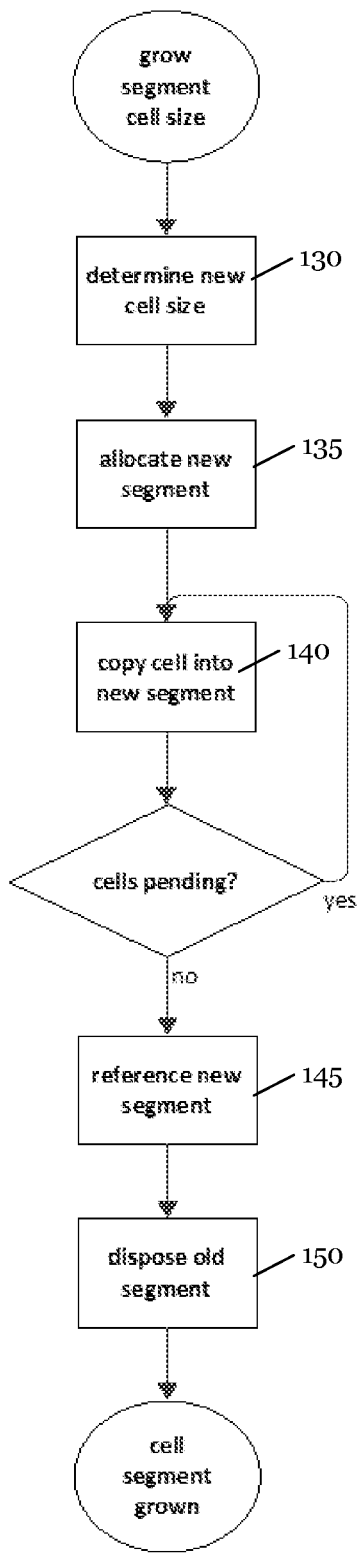

In the following detailed description, presently preferred embodiments of the invention are described with reference to the following figures:

FIG. 1: An exemplary tabular data structure with two columns divided into segments in accordance with an embodiment of the invention;

FIG. 2a: An exemplary tabular data structure in accordance with an embodiment of the invention before adding a new row;

FIG. 2b: The exemplary tabular data structure of FIG. 2a after the new row was added;

FIG. 3.: A flow chart illustrating the process of adding a row in accordance with an embodiment of the invention;

FIG. 4: A flow chart illustrating the process of updating a row in accordance with an embodiment of the invention;

FIG. 5: A flow chart illustrating the process of adapting the cell size of a segment in accordance with an embodiment of the invention; and FIG. 6: A schematic illustration of a tabular data structure according to the prior art.

4. DETAILED DESCRIPTION

Certain example embodiments of the present invention generally relate to techniques for storing tabular data in the (limited) main memory of a computer system in a particularly memory-efficient manner. A tabular data structure, as used in most database systems or other table stores, can be understood on a conceptual level as a two-dimensional table of rows and columns, in which individual data cells are stored.

Figure 6:
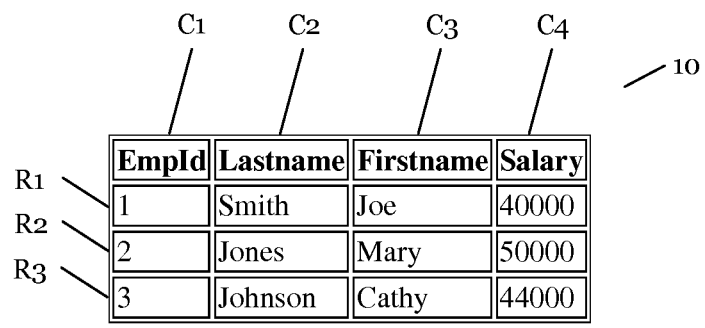

FIG. 6 shows a simple example of such a tabular data structure, namely a table storing data of employees together with their salaries. As can be seen in FIG. 6, the exemplary table comprises four columns C1, ..., C4 and three rows R1, ..., R3. It will be appreciated, however, that certain example embodiments of the present invention support tabular data structures having any number of columns C and rows R. Thus, tabular data can be understood as a table data structure where each column of the table can have a different data type, while the data type of each cell within one particular column is the same for the entire column. In the above example, all cells of the columns C2 "Lastname" and C3 "Firstname" comprise text (e.g. of the data type "String"), while the cells of the columns C1 "EmpId" and C4 "Salary" comprise numbers (e.g. of the data type "integer").

Embodiments of the invention allow fitting as much data as possible into the limited memory of a computer system, as the tables may be huge. Embodiments of the invention also allow growing the tables by adding rows R without rebuilding the table completely. Further, embodiments of the invention allow for replacing and/or deleting values without rebuilding the table completely. In addition, whole columns C may be as easily added, replaced and/or removed. All of these problems are solved by certain embodiments of the invention by using a table representation with variable word-width columns C divided into multiple segments S, and managing the table by an intelligent online algorithm.

In the following, three characteristics of a preferred embodiment of the present invention are described, namely (a) columnar table storage, (b) compression via a dictionary and (c) compression through choice of optimal data type. However, the present invention also encompasses embodiments having only a subset of these characteristics, as well as further embodiments having none of the characteristics (a)-(c), but only the further characteristics explained further below. For example, the present inventive concept of segmenting the columns of a tabular data structure would also be generally conceivable in a row-oriented storage system.

Columnar Table Storage

As explained above, a table data structure, as e.g. the table of FIG. 6, is conceptually a two-dimensional data structure. However, when such data structures are stored into the working memory (e.g. RAM) and/or persistent storage means (e.g. hard drive) of the underlying computer system, the storage system must serialize the two-dimensional structure into a one-dimensional series of bytes for the operating system to write to either the RAM, hard drive or both.

To this end, so-called row-oriented storage systems serialize all of the cells in a row R together, then the cells in the next row, and so on. Given the exemplary table of FIG. 6, this would result in the following:

1,Smith,Joe,40000;2,Jones,Mary,50000;3,Johnson,Cathy, 44000;

On the other hand, so-called column-oriented storage systems serialize all of the cells of a column C together, then the cells of the next column C, and so on:

1,2,3;Smith,Jones,Johnson;Joe,Mary,Cathy;40000, 50000,44000;

Accordingly, in this strategy, the columns C are represented as a sequence of cells. All cells of a column C have the same data type. Each cell is addressed by specifying the column C and the row R number of the cell. There is only at most one cell for each address. The data of a record (i.e. a row) in the table is spread over all the columns C of the table, but can be found under the same row number in each of the columns C.

A column C can have one of a plurality of different data types, e.g. integer number, floating point number, text, timestamp, or the like. Conceptually, the column C is a sequence of cells of the column data type, where each cell can be accessed by its row number.

If all cells in a column C have uniform size, the row number is the position in the sequence of cells. Then the cell of some given row R can be directly addressed without any need for searching it.

Compression Via a Dictionary

A dictionary can be used to map individual complex values onto simpler values. In case of text data this means that each unique character sequence is mapped onto an integer value. This dictionary compression compresses the data if values occur multiple times in a column C, because the recurring text is only stored once in the dictionary. This is one of the core ideas of the popular DEFLATE compression algorithm.

Applied to columnar storage (see above), this means that only the integer value is stored in the column cells. The dictionary is then used to translate from text to integer and back when interpreting the query and assembling the response. In embodiments of the invention, the fact that all cells contain simple integers reduces the query processing time, because no text parsing is needed while searching values in the table.

Compression Through Choice of Optimal Data Type

Generally, the memory consumption of a given table should be minimized, so that it allows fitting more data into memory while reducing the load on memory buses and caches, resulting in higher query processing speed. It is thus advisable to use as few bits as possible for representing individual integer numbers in the column C. Still, random access to an individual cell is fastest if all cells have the same capacity (i.e. number of bits) and the address calculation is a simple multiplication of row number and cell capacity. Therefore, the cell capacity is preferably the same for all cells, but at the same time only the minimum number of bits needed for storing the biggest integer number currently in the column C is used.

Column Segmentation

Considerable improvements in terms of memory consumption can be achieved over the prior art strategies by splitting each column C into multiple segments S. Each segment S preferably contains the same number of cells, so that the segment S addressed by a row number can be easily calculated. Still, between different columns C, the number of cells per segment S may differ.

All segments S of a column C share the same data type, but each segment S has its own cell capacity (also referred to as "cell size", i.e. the capacity/size of an individual data item/cell within a column). If one segment S needs to grow to a bigger cell capacity it can do so without any needed changes to other segment(s) S. The cell capacity of the segments S may then differ.

FIG. 1 shows a simple example of a table comprising two columns C (labeled "Duration" and "Quantity") and 12 rows R (numbered "0" to "11"). As can be seen, the column C1 "Duration" is split into a first segment S1 spanning rows 0 to 5 and into a second segment S2 spanning rows 6 to 11. The column C2 "Quantity" is split into three segments S3-S5, spanning rows 0 to 3, 4 to 7 and 8 to 11, respectively (i.e. the segments in column C1 have a segment size of 6, and the segments in column C2 have a segment size of 4). It can be seen in FIG. 1 that the cells of each segment S may have a different size, i.e. the segments S may have different cell capacities (illustrated by the different widths of the segments; note that e.g. segment S3 has a bigger cell capacity than segment S4). Within a particular column C, all segments have the same segment size (although alternative embodiments of the invention are conceivable in which the segment sizes of the segments within a particular column may differ).

If a new row R is about to be added to the table, it is added under any free row number, and for each column C the corresponding column segment S is checked whether it has a cell capacity suitable to store the new cell value. If the cell capacity is not sufficient, the column segment S is replaced by a new one with sufficient capacity and the existing values are migrated into the new segment S.

Optional Feature: Tradeoffs

The segment size (i.e. the maximum number of cells in a segment S) can be used for tuning the amount of additional temporary memory needed while migrating data into new columns. Further, if a segment S is allocated for storing many cells, but contains only few at a given point in time, the memory is wasted. For both reasons, smaller segment sizes are preferred. Those two goals, however, need to be balanced with two others. Firstly, the memory overhead per segment S becomes prohibitive if segments S are very small and numerous. Secondly, memory accesses to consecutive data are usually faster. Longer, medium sized segments S, therefore, may eventually lead to faster query processing.

The cell capacity growth factor influences how often the segment migration operation has to be performed. It also influences the amount of wasted memory if the cell capacity is bigger than needed for the value stored in the cell. When choosing the cell capacity there is thus a tradeoff between those two goals.

Optional Feature: Self-Adapting Segment Sizing

In order to make certain example embodiments of the present invention perform near-optimal for all constellations of data, mechanisms are proposed to automatically tune parameters towards the desired tradeoff goals.

Generally speaking, the segment size should fit to the properties of the execution environment. The absolute minimum segment size should be such that the bandwidth from main memory to the processor core is maximally exploited. Memory arrangement and cache sizes also play a role in this respect. Measurements may be used to find a good segment size for a concrete environment.

If there is a sizing deemed "optimal" for a certain execution environment it will be expressed in data words, rather than in number of cells. In order to have the optimal segment size in number of words it may be a good idea to choose a segment size (in number of cells), that results in the optimal number of words per segment S, if the segment S uses the optimal cell size. For example, if the optimal segment size in words is 128 and most cells have a size of two words, 64 cells is the optimal segment size. Statistics about existing data may be used to predict good parameters for new segments S.

If data is completely re-imported the statistics of the columns contents before the re-import may provide a good guideline for the sizing of the new segments S in terms of the expected total number of rows R. It would also be possible to re-use the existing segments S, but then no optimization of the sizing can be performed.

Apart from the segment size, i.e. the maximum number of cells per segment, the allocated size of the cells (i.e. the cell capacity) also has a big influence on both the memory consumption and possibly also on the frequency with which segments S need to be converted into a bigger cell size. The minimum and maximum values of the existing cells of a column value are often good predictors for the new values arriving through updates or additions. Thus, if new segments S are allocated with a cell size big enough, many conversions of segments S to a bigger cell size can be avoided.

The frequency of updates and removals may also be used as a guideline. If these operations often lead to segments S being converted into a different cell size, segments S should probably be smaller, as this can limit the effort for individual conversion operations.

Preferred Embodiment of the Method of the Invention

In the following, a preferred way of carrying out the invention will be described by means of several operations performed on the tabular data structures.

Reading Data from a Row

Reading data from a row R requires for each column C that shall be read:
1. To decode the row number into segment number in the column C and number within the segment S.
2. To read the cell value from the segment S.
3. If the column C has an associated dictionary (see above), to translate the cell value from the simple integer to the more complex data type.

Adding a Row

The process of adding a new row R to a tabular data structure is illustrated in FIG. 3. The process starts at step 100 ("find free row"). To add a new row R, first a free row number has to be found (e.g. the highest existing row number plus one). Then, the new cell values need to be added into the identified row R, each to its respective column C (cf. step 105). Let us assume that the cell values are just integer numbers and any dictionary operations (see above) have already taken place.

To add the cell value to a column C, the row number has to be decoded into the corresponding segment number and the cell number within the segment S (cf. step 110). When all segments S have the same size, the decoding is achieved through dividing the row number by the segment size (let the first row number be zero). The resulting quotient is the segment number and the remainder is the cell number within the segment S.

If there is not yet a segment S with the given segment number (because the row number corresponds to the table size), a new segment S is created (cf. step 115). The new segment S must have the same length (also referred to as "segment size") as the existing segments S in the respective column of the table. Its cell size can be determined as explained further above. Of course, it should be at least as big as required to accommodate the new cell value to be added.

In the alternative case that the segment S for the row R already exists, it has to be ensured that the new cell value fits into the cell size of the existing segment. If not, the segment cell size must be grown, i.e. expanded (cf. step 120), which is described further below.

In any case, the segment S is then ready to accommodate the new value and the new value can be written into the appropriate cell (cf. step 125).

As shown in FIG. 3, the process iterates (cf. step 105) in the same manner with all other columns C of the table until all have been extended with the new value.

An example of the above operation is shown in FIGS. 2a and 2b, where a new row "30;1235" is added to an existing table. Here, a new row is to be added behind all already existing rows. Since the table of FIG. 2a already comprises rows 0 to 9, the new row is added as row number 10. In the example, the row number 10 falls into the second segment of both columns. However, in column "Quantity" the second segment has a cell size too small for the new value "1235" (since this segment is currently sized to host the cells "87", "24", "12" and "7"). Therefore, the segment cell size is grown before the value is added. The result is shown in FIG. 2b, which illustrates that the second segment of the column "Quantity" was grown (note the larger width as compared to FIG. 2a) in order to accommodate the new cell value "1235".

Growing the Segment Cell Size

The process of growing/expanding the segment cell size (cf. step 120 in FIG. 3) is shown in FIG. 5. Similar to the process of creating a new segment S, a new cell size must be chosen (cf. step 130 in FIG. 5), which should be at least as big as needed for the newly added cell value. Afterwards, a new segment S is allocated (cf. step 135) and the contents of the old segment S are copied into it cell by cell (cf. step 140). Finally, the reference to the old segment S is changed to point to the new segment S (cf. step 145) and the memory allocated to the old segment S is freed (cf. step 150).

Updating a Row

The process of updating existing cell values, which is shown in FIG. 4, is similar to the strategy of adding new cell values shown in FIG. 3.

Removing a Row

Removals can be realized by either marking the removed row R as "removed" or by copying the very last row R into the position of the removed row R, which may in turn require segment migrations. In the former case, the step "find free row" (step 100 in FIG. 3) must check the table for a row R marked as removed and if there is none, return the number of the row R after the last row R. In the latter case, it can directly return that number without checking for a mark beforehand.

Glossary

Cell: A space in a table where a value is located. The cell can be addressed by specifying its row and column number.

Cell size: The amount of information that a data cell can hold, which also determines the amount of main memory that it occupies.

Segment size: The maximum amount of data cells in a segment.

Word: As used herein, the smallest unit of memory addressable in the underlying computer system.

Pseudo Code for Adding, Updating and Deleting Rows

In the following, an implementation of a preferred embodiment of the invention is explained by means of pseudo-code listings. Underlined text indicates the beginning of either a data type or a procedure declaration. Italic text contains comments. Indentation matters.

Data structures
<u>a table consists of:</u>
    columns (*numbered from 0 upwards*)
    maximum row number (*greatest used row number*)
    list of free row numbers
<u>a column consists of:</u>
    segments
    segment size
<u>a segment consists of:</u>
    cells
    (*can determine the cell capacity by inspecting any cell*)
<u>a cell is either:</u>
    an integer cell (with n-bits)
    or a floating point cell
*An n-bit integer cell shall contain one binary coded*
*integer number stored in n bits of memory.*
<u>a row consists of:</u>
    fields (*numbered from 0 upwards, with numbers*
*corresponding to the column numbers of the table*)
<u>a field is either:</u>
    an integer field,
    a floating point field
    or a text field
*For the sake of simplicity we only look at integer fields*
*and integer columns here.*
Procedures
<u>how to add a new row to a table:</u>
    pick any free row number y
    for each integer field of the row
        determine the column corresponding to the field
        add the field value to the y-th cell of the column
    for each other field of the row
        (*omitted for brevity*)
<u>how to update a row in a table given the row number y:</u>
    for each integer field of the row
        determine the column corresponding to the field
        set y-th cell of the column to the field value
    for each other field of the row
        (*omitted for brevity*)
<u>how to remove a row from a table:</u>
    mark the row number as free
    include the row number in the list of free rows
<u>how to read\* all rows of the table:</u>
    for each row number from 0 to the maximum row number
        if the row number is not marked as free
            then *read\** the row
\* = *Insert any other action instead.*
<u>how to initialize a new table given the column types:</u>
    set maximum row number to 0
    create an empty list of free row numbers
    for each column
        create a column record
        initialize the column record
<u>how to initialize a new column record:</u>
    choose the segment size as
        (*one variant, different options are discussed above*)
        maximum of (
            minimal segment size in words / expected cell size,
            expected table size / 100
        ) (*this way each segment contains exactly 1% of bigger*
*tables, under the assumption that the expected size is*
*correct; if the table is expected to be small, we have less*
*segments with each having the minimal reasonable segment*
*size*)
    store the segment size
    store an empty list of segments
<u>how to pick any free row number:</u>
    if the list of free row numbers is empty
        then increment the maximum row number of the table and
return it
        else remove and return the first number from the list
<u>how to add a field value to the x-th cell of a column:</u>
    the segment number y of the cell is x divided by the segment size of the column
    the cell number within the segment z is the remainder of that division
    if the column does not have a y-th segment then
        determine a cell capacity sufficient for the field value
        create the segment with that capacity
    set the z-th cell of the segment to the field value -continued

```
how to set the x-th cell of a column to a value v:
    the segment number y of the cell is x divided by the
segment size of the column
        the cell number within the segment z is the remainder of
that division
    set the z-th cell of the y-th segment to the value v
how to set the x-th cell of a segment to a value v:
    if the field value does not fit into the cell capacity of
the segment then
        determine a cell capacity sufficient for the field
value
        replace the segment by a new one with that capacity
    binary code the field value into the x-th cell
how to create a segment with a given cell capacity:
    create an array of cells
        with the array length being the default segment size
        and with the cells' bit field being exactly wide enough
for the desired cell capacity
    create a new segment containing this array
    add the segment to the columns' segment list (in last
position)
how to replace an old segment by a new one with a given
cell capacity:
    determine the used cell capacity of the old segment
    the new cell capacity is the maximum of the used capacity
and the given capacity
    create a new segment with the new cell capacity
    convert the cells from the old to the new segment
    replace the old segment by the new one in the the
columns' list of segments
    if there is no automatic garbage collection:
        free the memory allocated for the old segment
how to determine the used cell capacity of a segment:
    result := 0
    for each cell of the segment
        determine the cell capacity x sufficient for the cell
value
        if x > result
            then result := x
    return result
how to convert the cells from an old segment to a new
segment:
    both segments must have the same size
    for each cell in the old segment
        convert the cell value into the bit field width of the
new segment's cells
        write the converted value into the cell with the same
index in the new segment
```

Summary

In modern computer systems processing tabular data, such as database management systems or other storage systems, the problem of handling large tables in the limited available memory of the underlying computer system is a difficult issue. By viewing a table as a series of columns rather than rows and using segmentation for the columns (based on equal segment sizing), the preferred embodiment of the invention takes a different approach as compared to the conventional strategies. This in turn enables the provision of a mechanism for efficient handling of large tables in limited memory and a self-adapting mechanism to optimize the trade-offs with non-uniform data.

It will be appreciated that as used herein, the terms system, subsystem, engine, module, unit, programmed logic circuitry, and the like, may be implemented as any suitable combination of software, hardware, firmware, and/or the like. For instance, units and/or modules may be software controllable in connection with processing resources (e.g., at least one processor and a memory) of a computer system. It also will be appreciated that the storage locations herein may be any suitable combination of disk drive devices, memory locations, solid state drives, CD-ROMs, DVDs, tape backups, storage area network (SAN) systems, and/or any other appropriate tangible non-transitory computer readable storage medium. It also will be appreciated that the techniques described herein may be accomplished by having at least one processor execute instructions that may be tangibly stored on a non-transitory computer readable storage medium.

What is claimed is:

1. A method of storing data, the method comprising:
dividing, in connection with at least one processor of a column-oriented storage system including a tabular data structure having columns and rows, at least one of the columns of the tabular data structure into a plurality of segments, wherein each segment has a plurality of cells and an associated cell size which indicates the maximum size of the data items in the respective segment;
when storing a data item into one of the segments,
determining, in connection with the at least one processor of the storage system, whether the size of the data item exceeds the cell size of the segment; and
if the size of the data item exceeds the cell size of the segment, adapting, in connection with the at least one processor of the storage system, the cell size of the segment to accommodate the size of the data item;
wherein the adapting of the cell size of the segment to accommodate the size of the data item is performed without concomitantly adapting the cell sizes of the other of the plurality of segments.

2. The method of claim 1, wherein each segment has an associated segment size which indicates the maximum number of data items in the respective segment.

3. The method of claim 2, wherein all segments of a column have the same segment size.

4. The method of claim 2, further comprising determining an optimal segment size based on characteristics of the underlying hardware system.

5. The method of claim 2, further comprising determining an optimal segment size based on statistics on the data stored in the tabular data structure.

6. The method of claim 2, further comprising determining an optimal segment size based on the frequency of addition, update and / or removal operations performed on the data of the tabular data structure.

7. The method of claim 2, wherein the determining of an optimal segment size is performed automatically when data is added, updated and/or removed, automatically and periodically, and/or manually.

8. The method of claim 1, wherein the columns of the tabular data structure are stored one after the other in a working memory and / or persistent storage means of the storage system.

9. The method of claim 1, further comprising providing a dictionary data structure which maps data items to integer values and storing the integer value in the tabular data structure instead of the data item.

10. The method of claim 1, wherein the adapting of the cell size of the segment to accommodate the size of the data item comprises selecting a minimum number of bits needed for storing the biggest data item in the respective column.

11. The method of claim 4, wherein the characteristics of the underlying hardware system include a bandwidth between the working memory and the processor.

12. The method of claim 1, wherein at least one associated cell size of one segment is different from the other cell sizes of other segments.

13. The method of claim 1, further comprising:
storing the columns of the tabular data structure one after the other in memory; and
determining an optimal segment size based on characteristics of the memory.

14. The method of claim 1, wherein each said cell of a segment is of a common cell size.

15. A non-transitory computer readable storage medium tangibly storing a computer program comprising instructions for implementing the method of claim 1.

16. A column-oriented storage system for storing data, the system comprising:

processing resources including at least one processor and a memory;

a dividing unit, under control of the processing resources of the column-oriented storage system including a tabular data structure having columns and rows, configured to divide at least one of the columns of the tabular data structure into a plurality of segments, wherein each segment has a plurality of cells and an associated cell size which indicates the maximum size of the data items in the respective segment;

a storage unit, under control of the processing resources, configured to store a data item into one of the segments, the storage unit being further configured to:

determine whether the size of the data item exceeds the cell size of the segment; and if the size of the data item exceeds the cell size of the segment, adapt the cell size of the segment to accommodate the size of the data item;

wherein the adapting of the cell size of the segment to accommodate the size of the data item is performed without concomitantly adapting the cell sizes of the other of the plurality of segments.

17. The system of claim 16, wherein each segment has an associated segment size which indicates the maximum number of data items in the respective segment.

18. The system of claim 17, further comprising a first unit configured to determine an optimal segment size based on characteristics of the underlying hardware system.

19. The system of claim 17, further comprising a second unit configured to determine an optimal segment size based on statistics on the data stored in the tabular data structure.

20. The system of claim 18, wherein the characteristics of the underlying hardware system include a bandwidth between the working memory and the processor.

21. The system of claim 17, wherein all segments of a column have the same segment size.

* * * * *